J. MOORE.
COMBINED DISK HARROW AND LAND ROLLER.
APPLICATION FILED OCT. 5, 1909.
963,618.
Patented July 5, 1910.
2 SHEETS—SHEET 1.
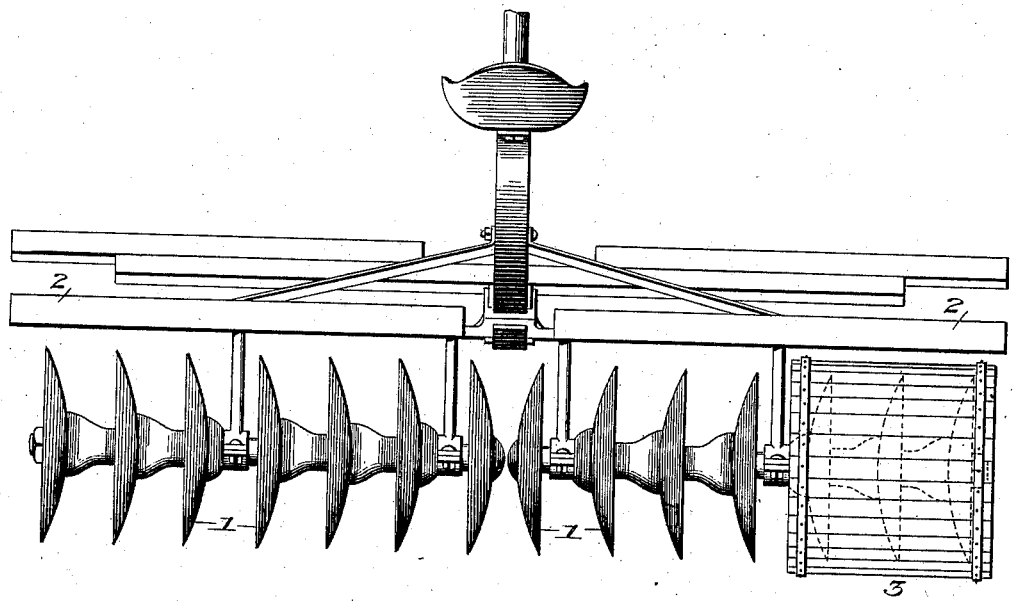
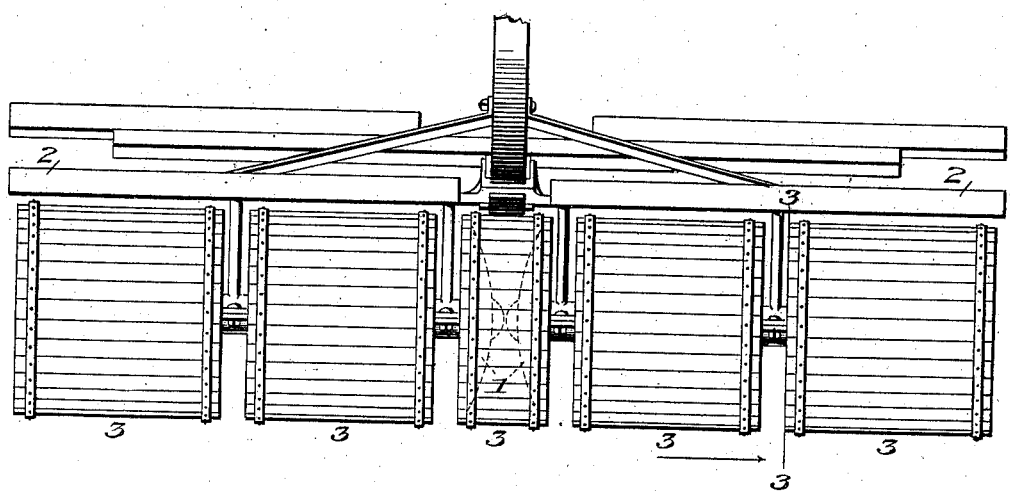
Witnesses
Inventor
James Moore
By Henry N. Copp
his Attorney J. MOORE.
COMBINED DISK HARROW AND LAND ROLLER.
APPLICATION FILED OCT. 5, 1909.
963,618.
Patented July 5, 1910.
2 SHEETS—SHEET 2.
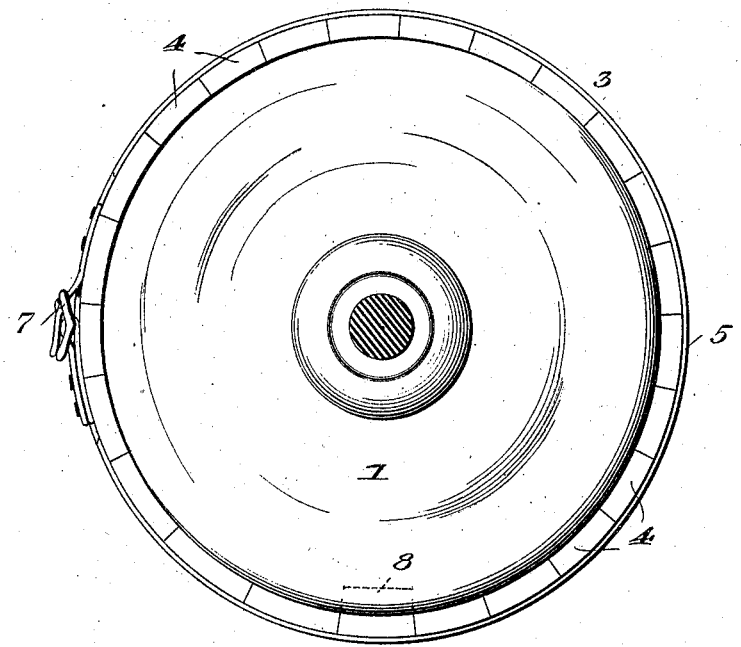
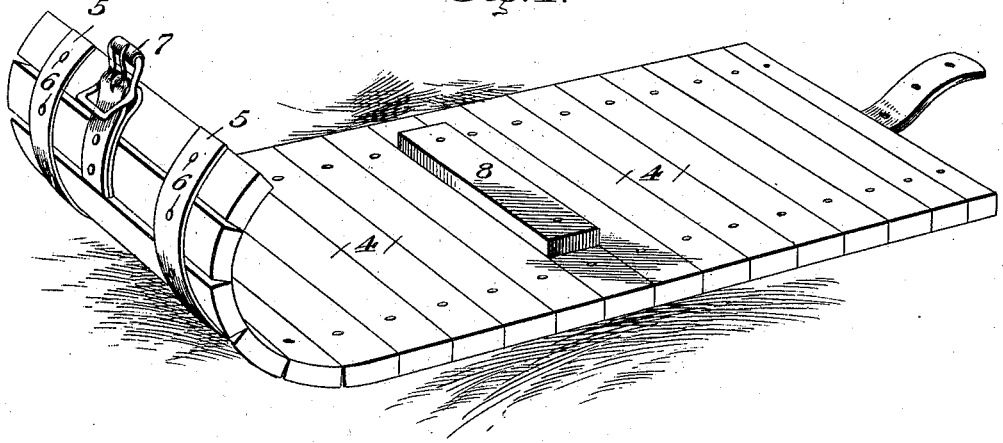

UNITED STATES PATENT OFFICE.

JAMES MOORE, OF WETASKIWIN, ALBERTA, CANADA.

COMBINED DISK HARROW AND LAND-ROLLER.

963,618.   Specification of Letters Patent.   Patented July 5, 1910.

Application filed October 5, 1909. Serial No. 521,172.

*To all whom it may concern:*

Be it known that I, JAMES MOORE, a subject of the King of England, residing at Wetaskiwin, Alberta, Canada, have invented certain new and useful Improvements in Combined Disk Harrows and Land-Rollers, of which the following is a specification.

This invention relates to combined disk harrows and land rollers.

The object of the present invention is the provision of a combined land roller and disk harrow of novel construction which can be readily converted into either a disk harrow or a land roller, according to requirements, will be of simple, strong, and durable construction and efficient in use.

In carrying out the invention I provide harrow disks carried by a suitable frame, and a roller case or cover, one or more of which may be used according to the number of harrow disks employed and their arrangement, which may be made to encircle the harrow disks and to cover them, or removed when the machine is to be used as a harrow, all of which will appear more fully hereinafter.

In the accompanying drawings:—Figure 1 is a rear elevation of the invention but with only one of the roller covers applied so as to illustrate how the covers embrace the harrow disks; Fig. 2, a view like Fig. 1, showing all of the harrow disks covered, the machine being then adapted for use as a land roller; Fig. 3, an enlarged section on line 3—3 of Fig. 2, showing the construction of the roller cover and the manner in which it is secured to the roller disks; and Fig. 4, a detail view of one of the roller covers spread out, illustrating its articulated construction.

The harrow consists of a number of harrow disks 1, mounted in gangs in any desired manner and having any suitable framework 2.

According to the arrangement of the harrow disks, there are provided one or more roller covers 3 which encircle the disks and are secured thereto in any preferred manner. The construction of these harrow covers may greatly vary as may the fastenings for securing them, but a preferred construction is that shown in detail in Figs. 3 and 4 where 4 designates a number of wooden or other suitable slats of slightly greater length than the length of the gang of the harrow disks to be covered, said slats 4 being articulated or secured together by suitable metallic or other straps 5 secured thereto at 6 so that the slats are arranged in parallel arrangement. Any suitable fastening 7 may be employed for drawing together the ends of the cover. Any suitable means may be employed for preventing the cover from slipping off the harrow disks but I have found that one or more retaining members 8 secured to the slats 4 so that they will lie between the harrow disks covered, efficiently prevent detachment of the cover.

When the machine is intended for use as a harrow the cover or covers are removed, but when it is desired to convert the machine into a land roller the covers are secured around and to the harrow disks as illustrated in Fig. 2 but may be readily detached at any time.

My invention enables the user to convert any disk harrow into an efficient land roller at will, at very small expense.

I wish it understood that the invention is susceptible of many changes and modifications and I do not limit myself to the precise constructions shown and described.

Having thus described my invention what I claim as new and desire to secure by Letters Patent, is:—

1. The combination with a disk harrow, of a separate, removable flexible roller cover adapted to encompass the harrow disks.

2. The combination with a disk harrow, of a separate, removable roller cover adapted to encompass the harrow disks which consists of articulated slats and means for securing them on the harrow disks.

3. The combination with a disk harrow, of a roller cover consisting of articulated slats having means to secure them tightly around the peripheries of the harrow disks and provided with means to engage the harrow disks and prevent lateral displacement of said cover.

In testimony whereof, I hereunto affix my signature in presence of two witnesses.

JAMES MOORE.

Witnesses:
 ALF. H. BARNARD,
 W. M. CHARTRES.